Figure 1:
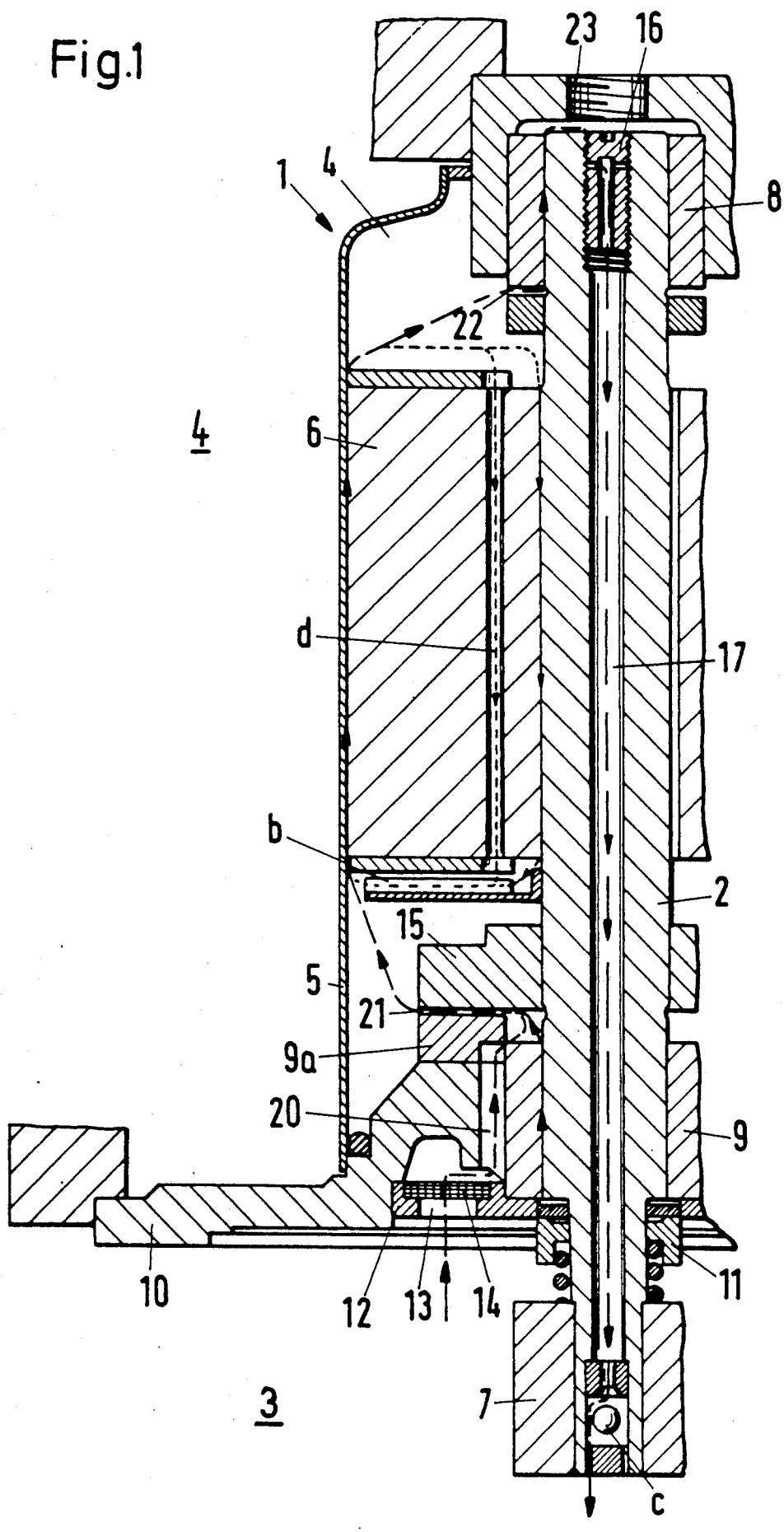
Figure 1A:
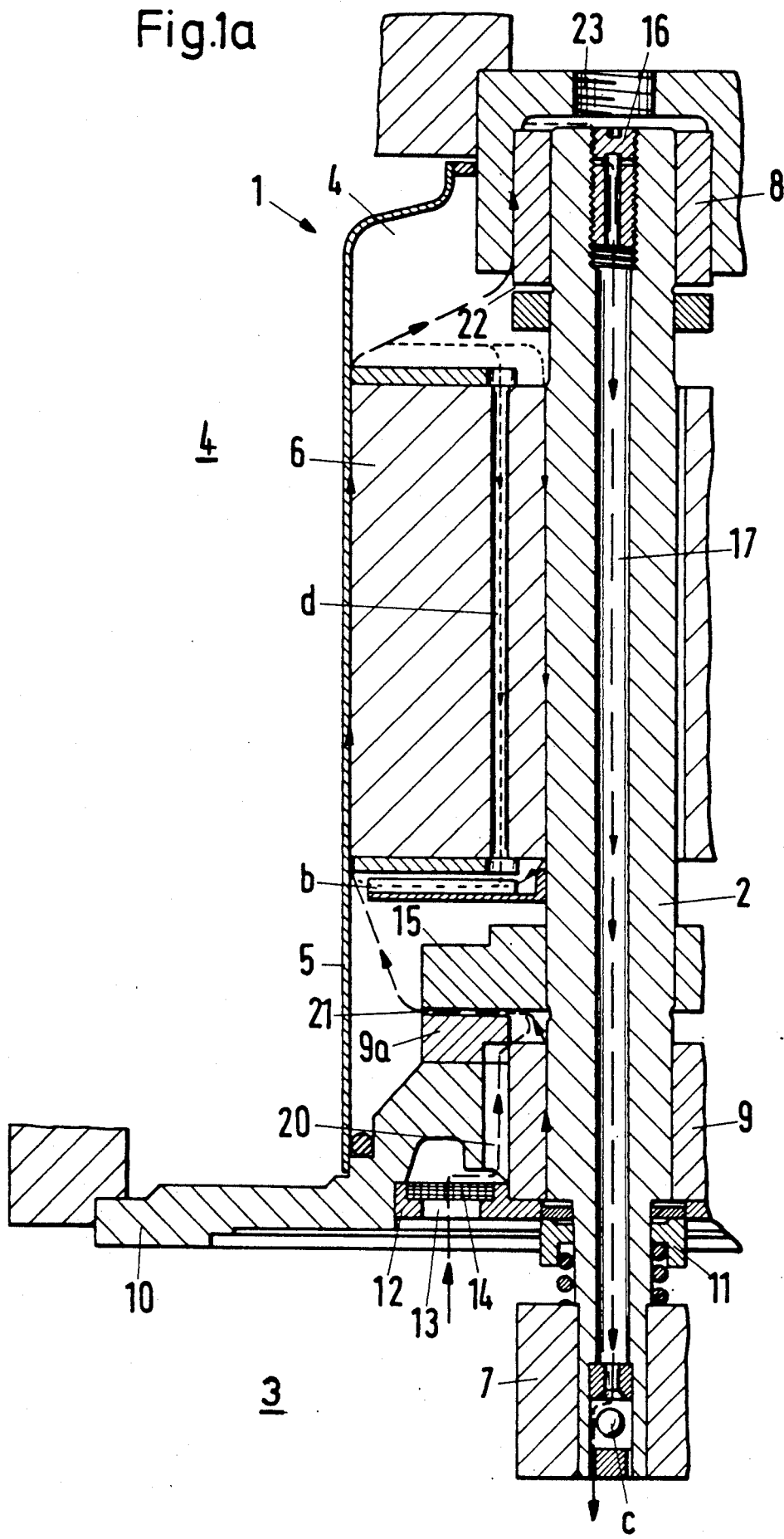

United States Patent [19]

Genster

[11] Patent Number: 5,044,896

[45] Date of Patent: Sep. 3, 1991

[54] SPLIT TUBE CENTRIFUGAL PUMP

[75] Inventor: Albert Genster, Marl, Fed. Rep. of Germany

[73] Assignee: Wilo-Werk GmbH & Co. Pumpen - und Apparatebau, Dortmund, Fed. Rep. of Germany

[21] Appl. No.: 537,164

[22] Filed: Jun. 11, 1990

Related U.S. Application Data

[63] Continuation of Ser. No. 265,040, Oct. 31, 1988, abandoned.

[51] Int. Cl.[5] .............................................. F04B 39/00
[52] U.S. Cl. .................................... 417/365; 417/368; 417/370; 417/423.9
[58] Field of Search ............ 417/368, 370, 372, 423.1, 417/365, 423.8, 423.9, 424.1

[56] References Cited

U.S. PATENT DOCUMENTS

| | | | |
|---|---|---|---|
| 1,998,604 | 4/1935 | Belden | 417/372 |
| 2,738,919 | 3/1956 | Rusch et al. | 417/372 |
| 2,809,590 | 10/1957 | Brown | 417/370 |
| 2,855,139 | 10/1958 | Weibel | 417/372 |
| 3,220,350 | 11/1965 | White | 417/365 X |
| 3,288,073 | 11/1966 | Pezzillo | 417/365 X |
| 3,318,253 | 5/1967 | Campolong | 417/368 |
| 3,790,309 | 7/1974 | Volz | 417/368 |
| 4,047,847 | 9/1977 | Oikawa | 417/420 |
| 4,065,231 | 12/1977 | Litzenberg | 417/365 X |
| 4,502,697 | 3/1985 | Heinl | 277/50 |

FOREIGN PATENT DOCUMENTS

| | | |
|---|---|---|
| 1753442 | 9/1956 | Fed. Rep. of Germany . |
| 1098820 | 2/1961 | Fed. Rep. of Germany . |
| 1100788 | 7/1962 | Fed. Rep. of Germany . |
| 1453772 | 2/1969 | Fed. Rep. of Germany . |
| 1528700 | 1/1970 | Fed. Rep. of Germany . |
| 1528718 | 3/1976 | Fed. Rep. of Germany . |
| 2706511 | 8/1978 | Fed. Rep. of Germany . |
| 2160861 | 11/1980 | Fed. Rep. of Germany . |
| 2516575 | 8/1982 | Fed. Rep. of Germany . |
| 2460748 | 9/1982 | Fed. Rep. of Germany . |
| 2941133 | 1/1985 | Fed. Rep. of Germany . |
| 3506648 | 8/1985 | Fed. Rep. of Germany . |
| 1152344 | 2/1958 | France . |
| 1407672 | 6/1965 | France . |
| 855628 | 12/1960 | United Kingdom . |
| 862415 | 3/1961 | United Kingdom . |
| 1127310 | 9/1968 | United Kingdom . |

Primary Examiner—Leonard E. Smith
Assistant Examiner—Eugene L. Szczecina, Jr.
Attorney, Agent, or Firm—Marmorek, Guttman & Rubenstein

[57] ABSTRACT

A split tube centrifugal pump comprises a pump casing divided into a pump space and a motor space, an impeller driving a conveying fluid in the pump casing, a vertically disposed shaft in the casing, the shaft being hollow and including an axial channel therein, a rotor including a channel therein, and a partition separating the pump space from the motor space. The partition includes a first aperture through which the shaft passes and a second aperture. The conveying fluid circulates between the pump space and the motor space in a circuit comprising the first aperture in the partition, the channel in the rotor, and the channel in the shaft. In a particularly preferred embodiment of the invention, the split tube centrifugal pump further comprises a filter disposed upstream or downstream of the first aperture in the partition, and a slide ring sealing associated with the second aperture and through which the vertical shaft passes.

11 Claims, 9 Drawing Sheets

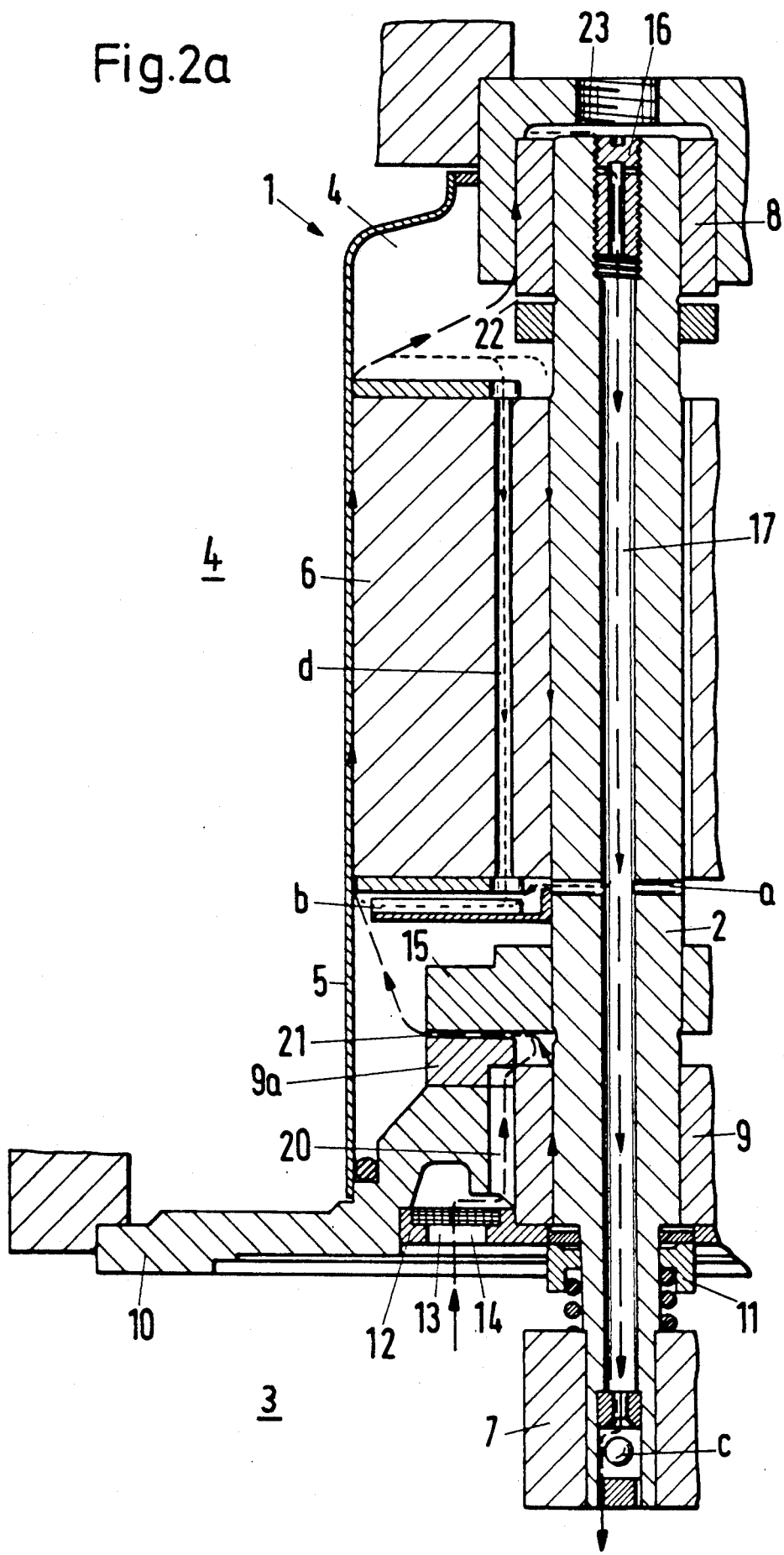

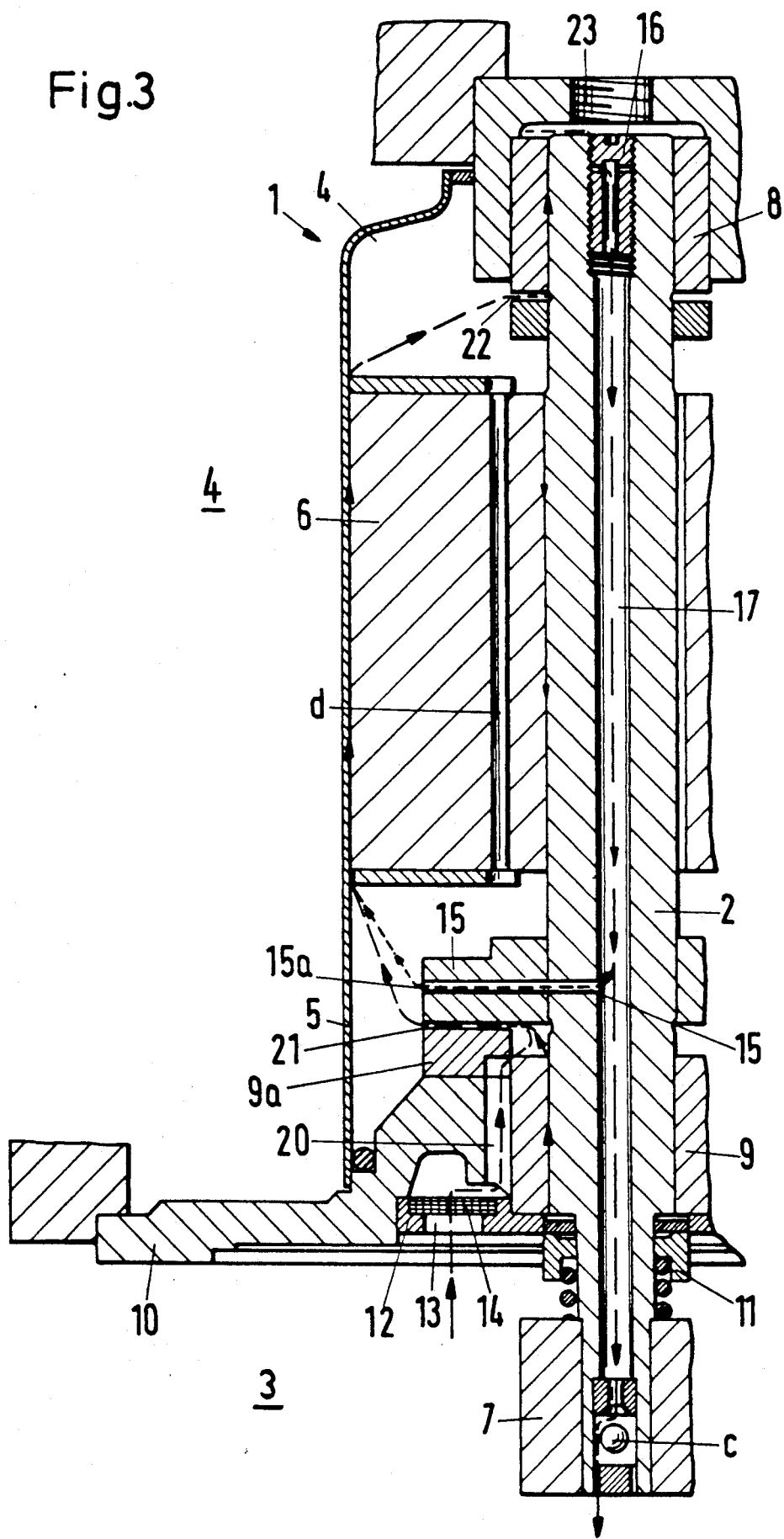

SPLIT TUBE CENTRIFUGAL PUMP

This is a continuation, of application Ser. No. 265,040 filed Oct. 31, 1988, now abandoned.

The invention relates to a split tube centrifugal pump having in the pump casing an impeller rigidly attached to a more particularly vertical shaft (2), on which the rotor (6) of the driving electric motor is also disposed, wherein:

the shaft (2) extends through the partition (10) which is disposed between the pump space (3) and the motor space (4), the shaft (2) is hollow and its inner cavity (17) connects the motor space (4) filled with conveying fluid to the pump space (3), a second connection exists between the motor space (4) and the pump space (3) via at least one aperture (13) in the partition (10), to form a conveying fluid circuit between the pump space and the motor space.

Split tube centrifugal pumps are used more particularly for the circulation of heating water. The motors of such pumps become considerably heated, and air may collect inside the split tube in the motor space. Such air cannot escape from the motor, more particularly if the pump is incorporated with a vertical shaft, the electric motor pointing upwardly.

It is an object of the invention to provide a split tube centrifugal pump of the kind specified whose motor is cooled in an optimum manner. It is also an object of the invention to prevent the formation of steam and deposits of dirt in the motor space.

These objects are achieved according to the invention by the feature that there is within the motor space an internal conveying fluid circuit which extends through the rotor.

The internal circuit disposed in the motor is used to constrainedly generate a conveying fluid flow through the motor space inside the split tube. Such a flow over the whole length of the motor as far as the furthermost end of the motor space remote from the pump runner results in optimum motor cooling, while moreover reliably preventing accumulations of gas, formations of steam and also dirt deposits. The extra constructional steps required are small, and weight is saved.

Since there is always a fluid pressure gradient between the two ends of the shaft, a constant flow of the conveying medium is ensured, so that venting and cooling are always reliably performed during pump operation.

A particularly simple construction with reliable internal circulation is created if for the drive of the internal circuit the rotor has a channel, more particularly a bore, which is not parallel with the shaft.

The internal circuit can be variously constructed. Simple constructions are:

on its outward path the conveying fluid flows between the outside of the rotor and the inside of the split tube and on its return path through the cavity in the shaft;

on its outward path the conveying fluid flows between the outside of the rotor and the inside of the split tube and on its return path through a channel, more particularly a bore, which is disposed in the rotor laterally of the shaft;

the channel is a substantially radial bore disposed in the shaft;

the channel is formed by a disc or ring which is attached to the shaft alongside the rotor;

the channel is formed by a bladed wheel which is attached laterally of the rotor.

The last-mentioned construction also generates a particularly strong internal flow. The same thing also applies if the channel disposed in the rotor laterally of the shaft for conveying the internal circuit is at an inclination to the shaft and more particularly helical.

Particularly advantageously a more particularly adjustable throttle is disposed in the inner cavity in the shaft. Such a throttle, more particularly at the end of the cavity in the shaft remote from the runner, enables the flow rate of the conveying medium to be precisely determined. Moreover, the discharge of conveying medium through the shaft bore can be reduced due to the static pressure of the system by opening the outer venting and deblocking screw of such a pump.

Also according to the invention a sieve and/or filter is disposed in, upstream or downstream of the aperture in the partition. Such a filter ensures that the flow cannot introduce particles of dirt into the motor space.

When the pump is switched off, the still moving conveying medium presses against the end face of the shaft at the level of the runner. This flow in the reverse direction can introduce particles of dirt into the motor space. This is prevented by the feature that a sieve and/or filter is disposed in, upstream or downstream of the aperture via which the cavity in the shaft discharges into the pump space.

Particularly advantageously the shaft is mounted in the zone of the partition by a slide ring sealing. This gives protection to the shaft bearing disposed adjacent the impeller, since it ensures that conveying medium does not flow through such bearing and therefore particles of dirt cannot be deposited at that place.

Although as a rule merely the differential pressure between the two shaft ends is adequate to produce a flow inside the motor space, a flow can also be produced or reinforced by the feature that the aperture and the shaft, from which the conveying liquid emerges from the cavity in the shaft into the pump space, is disposed substantially radially or at an inclination in relation to the shaft axis. The shaft can have an aperture, more particularly a bore, radial or at an inclination to the axis in a zone inside the motor space.

In FIGS. 1, 1a, 2, 2a, 3, 3a, 4, 4a, and 5, various embodiments of the invention are shown in longitudinal section and will now be described in greater detail.

A split tube pump 1 is disposed with its shaft 2 vertical, an electric motor which drives the pump being disposed above the pump space 3. The motor space 4 is divided by a split tube 5 which is disposed coaxially with the shaft 2 and between the rotor 6 of the electric motor and a stator (not shown). Conveying fluid is disposed inside the split tube 5.

The shaft 2 is a hollow shaft which bears both the rotor 6 of the electric motor and the runner 7 of the centrifugal pump. The drawing shows only a portion of the hub of the runner 7. The shaft 2 is mounted in an upper radial carbon bearing 8 and a lower radial carbon bearing 9, the bearing 8 being disposed adjacent the end of the shaft 2 remote from the runner 7, and the bearing 9 adjacent the runner 7 in the zone of a partition (bearing plate) 10 separating the pump space 3 from the motor space 4. Disposed in the partition 10 between the bearing 9 and the runner 7 is a slide ring sealing 11 which prevents conveying medium from flowing through the bearing gap between the bearing 9 and the shaft 2 if the filter 14 becomes clogged.

Attached coaxially inside the partition 10 is a carrier ring 12 which encloses the shaft 2 and is formed with at least one bore or aperture 13 through which the conveying fluid can flow from the pump space 3 to the motor space 4. Disposed downstream of the bore 13 is a more particulary disc-shaped, annular filter 14 of sintered metal. The conveying fluid flows through the bore 13 and the filter 14 into the motor space 4 on the outside past the radial carbon bearing 9 and passes through a flange-shaped upper axial bearing 9a to a radial gap between the axial bearing 9a and a steel disc 15 which is rotatably attached to the shaft 2 and bears against the axial bearing 9a. The fluid then flows between the outside of the rotor 6 and the inside of the split tube 5 to the rear end of the shaft 2, where it enters the cavity in the shaft at its end face. Disposed at this place in the cavity in the shaft is a throttle 16 which can be formed by a throttle screw via which the size of the throttle aperture can be adjusted. The throttle screw can be reached via an external venting screw (not shown) at the end face of the electric motor.

The conveying fluid flows through the shaft 2 from the outer end to the suction neck of the runner and is sucked in at that place, since a negative pressure exists there in comparison with the pressure in the split tube. Disposed in the end of the hollow shaft at the outlet of the cavity 17 in the shaft is a ball check valve c ensuring that dirty water cannot enter the shaft 2. The valve c also prevents hot fluid from being discharged from the pump when the screw 23 in the pump end face above the throttle 16 is opened. However, the throttle 16 can also be omitted, if relatively large quantities are to flow through the circuits.

In one alternative (FIGS. 4 and 4a) at least one radial bore 2a can be disposed in the shaft 2 adjacent the impeller 7 to connect the outside of the shaft 2 to its cavity 17, in order to achieve thereby an additional or alternative pumping effect for the fluid flowing through the motor space. In that case the shaft can be closed at its end face adjacent the impeller. In another alternative (FIGS. 3 and 3a) the shaft can have inside the motor space 4 at least one radial bore 15a, resulting in a circulation of the fluid inside the split tube 5. This radial or inclined bore 15a can be extended by a bore in the steel disc 15, thereby enhancing the pumping effect for this internal circuit.

Attached to the rotor 6 on the side adjacent the impeller is a bladed wheel b which circulates the fluid in the internal circuit in the motor space 4. The bladed wheel b receives the fluid either from the cavity 17 in the shaft via radial bores a (FIGS. 2 and 2a) bores d, which are disposed axis-parallel at regular intervals in the rotor 6. In another alternative the bladed wheel b can be omitted and the fluid flowing through the bores d be conveyed by the bore d extending at an angle to the shaft 2 or helically. The single drawing therefore shows a number of pump constructions drawn all together, there being an external and an internal The external, cooling circuit also to be conveyed away in the form of steam and gases covers the following path; The fluid passes via the bore 13 and filter 14 from the pump space 3 into the motor space 4 and flows via at least one axis-parallel channel 20 and radial channels 21 to the rotor 6. The fluid passes through the rotor via the gap between the outside of the rotor 6 and the split tube 5 in the upward direction, where it moves inwards in the zone of the radial carbon bearing via a gap 22 or channels far enough to flow on the outer periphery of the shaft 2 to the upper shaft end and (See FIGS. 1, 2, 3, 4) thence via the throttle 16 into the cavity 17 in the shaft. The fluid then flows through the cavity 17 in the shaft downwards to the check valve c, where it emerges into the pump space. In the zone of the radial carbon bearing 8 the fluid can also flow upwards on the outside of the bearing (See FIGS. 1a, 2a, 3a, and 4a) to reach the throttle 16.

Figure 3A:
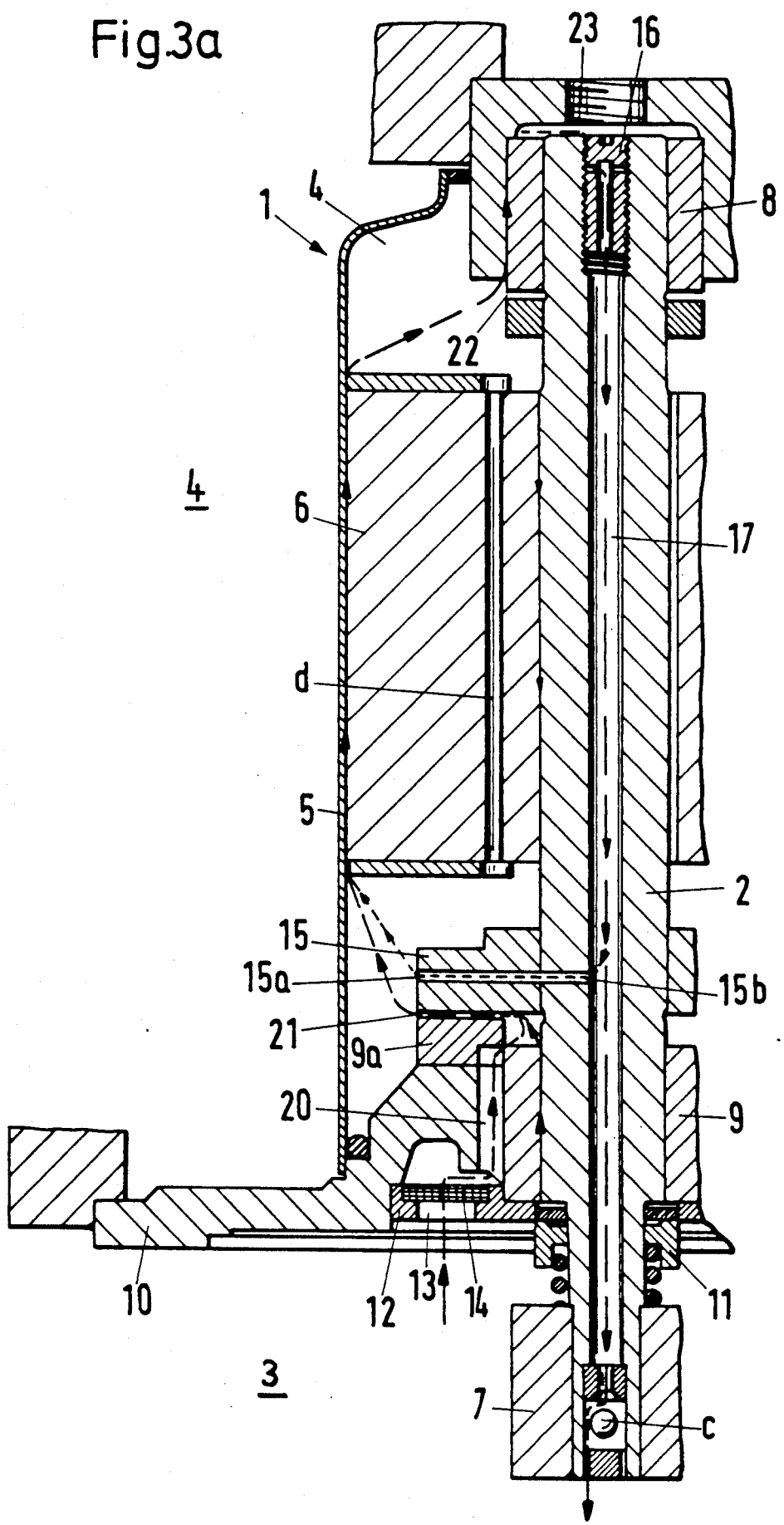

For the internal fluid circuit which ensures the cooling of the motor the following paths can be followed in accordance with the different constructions:

1. Referring to FIGS. 3 and 3a, from the cavity 17 in the shaft the fluid passes via a radial bore 15b into a bore 15a disposed in the steel disc 15. The bores 15a and 15b thereby form the pumping effect for the internal circuit. From the bore 15a the fluid flows between the outside of the rotor 6 and the inside of the split tube 5 in the upward direction, where it follows the same path along the bearing 8 as the external circuit.

Figure 2:
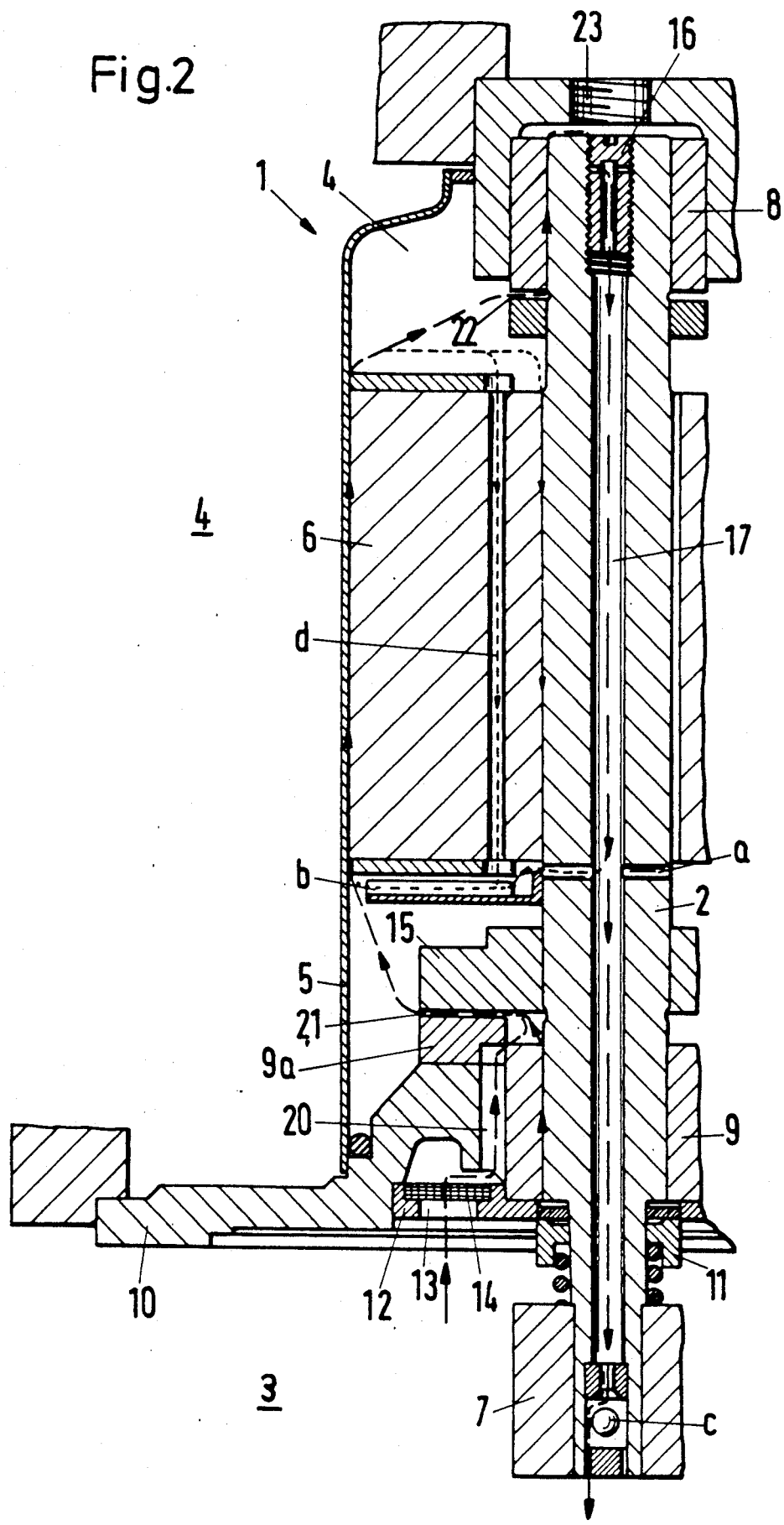

2. Referring to FIGS. 2 and 2a, the fluids out of the cavity 17 in the shaft through a bore a to the blade wheel b, whence it is conveyed upwardly on the outside past the rotor 6 and again along the bearing 8 through the throttle 16 and back into the cavity 17 in the shaft.

3. The internal circuit does not pass only through the cavity 17 in the shaft, but the rotor 6 is formed at regular intervals with axis-parallel bores d through which the fluid flows from the upper zone of the motor space 4 downwardly to the bladed wheel b and thence again upwards on the outside of the rotor 6. In this case the bores a, 15a and 15b are absent See FIGS. 1, and a.

4. Referring to FIGS. 3 and 3a, the internal circuit again flows through the bore d, but in this case the bladed wheel b is omitted, and the internal circuit is driven by the bore d extending at an angle to the shaft 2 or helically.

5. The internal circuit flows through the cavity 17 in the shaft downwards and via the bore a outwards, whence it flows through the bore d upwards and then laterally past the bearing 8 through the throttle 16 and back to the cavity 17 in the shaft. A portion of the flow flowing through the bores a can also flow not only upwards through the bores d, but additionally upwards through the gap existing between the outside of the rotor 6 and the inside of the split tube 5.

In all these cases optimum cooling of the rotor is achieved, while at the same time there is a constant exchange between the fluid of the internal circuit and that of the external circuit.

Figure 4:
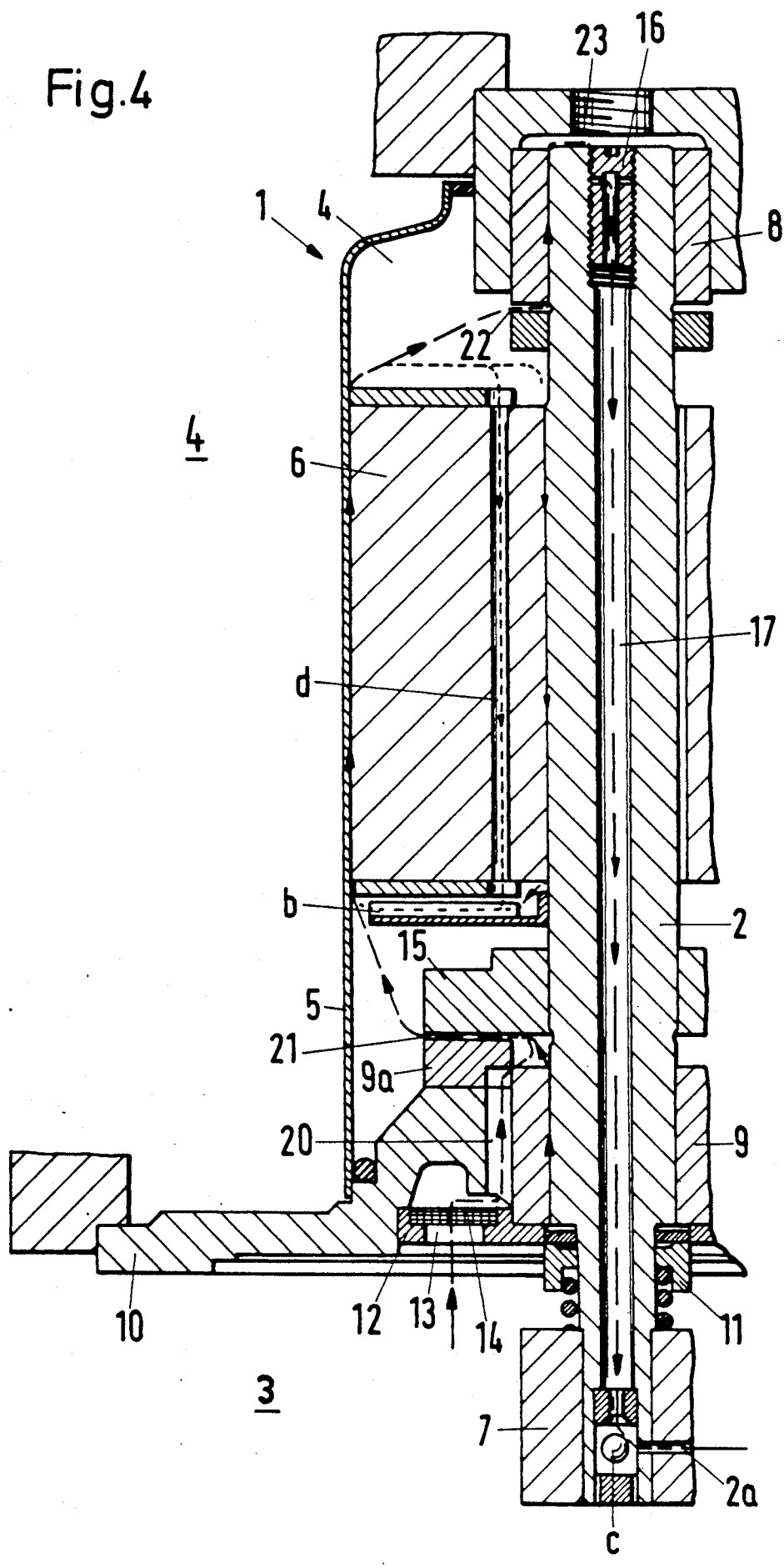
Figure 4A:
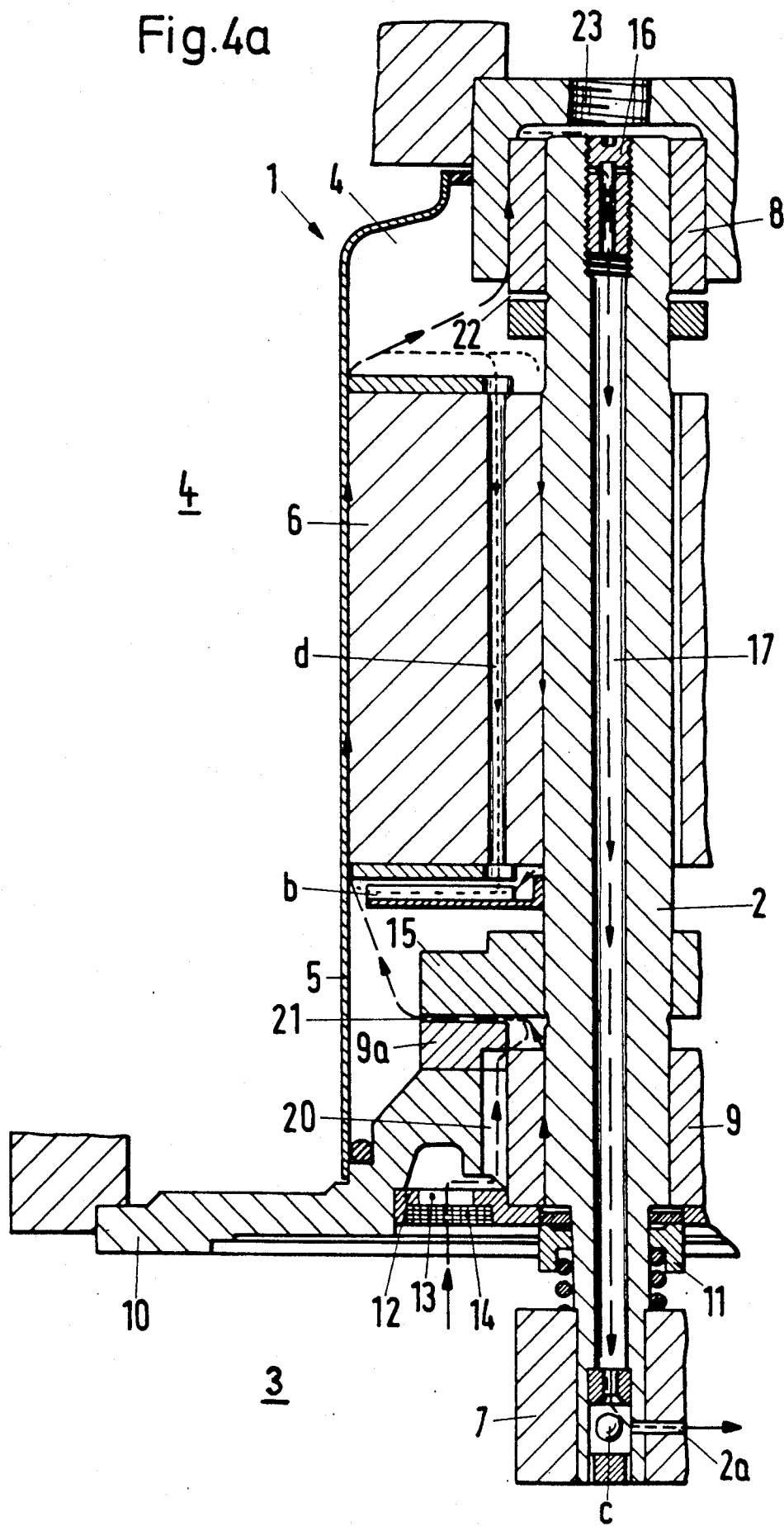
Figure 5:
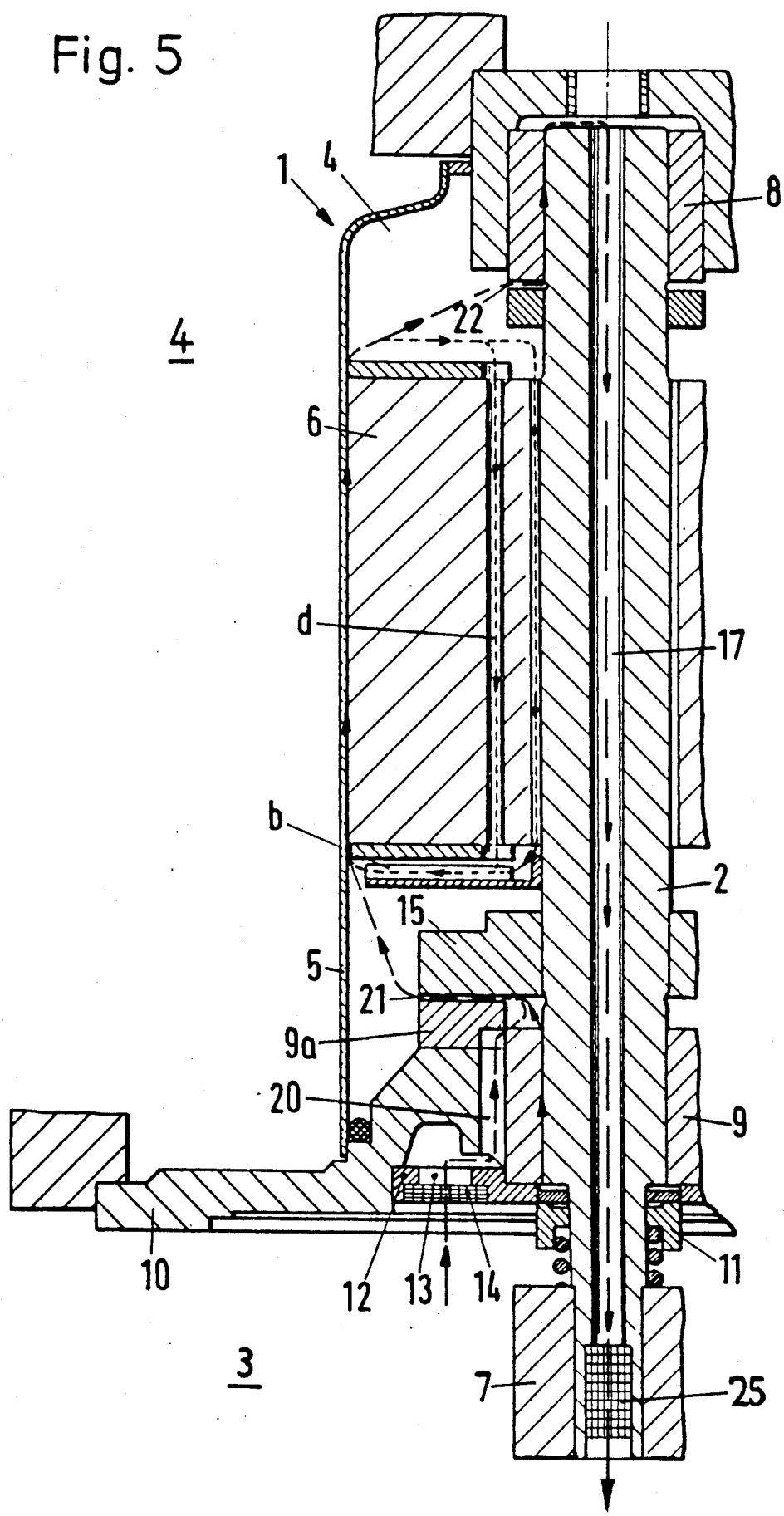

FIG. 4a shows the filter 14 upstream of bore 13 in the partition 10. FIG. 5 shows a second filter 25 in the cavity 17 of shaft 2 in place of ball check valve c.

I claim:

1. A split tube centrifugal pump, comprising
   a pump casing divided into a pump space and a motor space,
   a conveying fluid in said pump casing,
   a vertically disposed shaft in said casing, said shaft being hollow and including an axially extending channel therein,
   an impeller mounted on said shaft and driving said conveying fluid in said pump casing,
   a rotor including a first channel associated with said rotor and disposed between said rotor and said pump casing,
   a partition separating said pump space from said motor space, said partition including a first aperture and a second aperture, said shaft passing through said second aperture, said conveying fluid circulating between said pump space and said motor space in a first circuit comprising said first aperture, said first channel associated with said rotor, and said channel in said shaft, a filter in juxtaposition with said first aperture in said partition, a slide ring sealing retaining said shaft in said second aperture of said partition, and a second channel associated with said rotor and in fluid communication with said first circuit so that said conveying fluid can circulate in a second circuit which bypasses a portion of said first circuit.

2. The split tube centrifugal pump of claim 1 wherein said conveying fluid flows first between the outside of said rotor and the inside of said split tube and thereafter flows through said channel in said shaft in said first circuit.

3. The split tube centrifugal pump of claim 1 wherein said conveying fluid flows first between the outside of said rotor and the inside of said split tube, and thereafter flows through said second channel associated with said rotor in said circuit.

4. The split tube centrifugal pump according to claim 1 wherein said second channel associated with said rotor comprises a radial bore disposed in said shaft.

5. The split tube centrifugal pump according to claim 1 further comprising a disc disposed on said shaft, said second channel associated with said rotor being formed in said disc.

6. The split tube centrifugal pump according to claim 1 comprising a bladed wheel disposed on said shaft, said second channel associated with said rotor being formed between said blade wheel and said rotor.

7. The split tube centrifugal pump of claim 1 further comprising a throttle located at one end of said shaft.

8. The split tube centrifugal pump of claim 1 wherein said filter is disposed upstream of a bore in said partition.

9. The split tube centrifugal pump of claim 1 wherein said filter is disposed downstream of said partition.

10. The split tube centrifugal pump of claim 1 further comprising a second filter associated with said shaft through which said conveying fluid in said channel of said shaft is discharged.

11. The split tube centrifugal pump according to claim 1 further comprising a radially extending aperture located at an end of said shaft, with conveying fluid in said channel of said shaft being discharged into said pump space through said radially extending aperture.

* * * * *